United States Patent
Branson et al.

(10) Patent No.: US 10,216,795 B2
(45) Date of Patent: Feb. 26, 2019

(54) FIELD-PROGRAMMABLE GATE ARRAY CARDS IN A STREAMING ENVIRONMENT

(71) Applicant: International Business Machines Corporation, Armonk, NY (US)

(72) Inventors: Michael J. Branson, Rochester, MN (US); Jay S. Bryant, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 14/956,424

(22) Filed: Dec. 2, 2015

(65) Prior Publication Data

US 2017/0161331 A1   Jun. 8, 2017

(51) Int. Cl.
G06F 17/30 (2006.01)

(52) U.S. Cl.
CPC .. G06F 17/30516 (2013.01); G06F 17/30519 (2013.01); G06F 17/30958 (2013.01)

(58) Field of Classification Search
None
See application file for complete search history.

(56) References Cited

U.S. PATENT DOCUMENTS

| | | | |
|---|---|---|---|
| 5,361,373 A | 11/1994 | Gilson | |
| 6,047,115 A | 4/2000 | Mohan et al. | |
| 6,237,029 B1 * | 5/2001 | Master | G06F 15/7867 709/217 |
| 7,584,345 B2 | 9/2009 | Doering et al. | |
| 7,603,540 B2 | 10/2009 | Doering et al. | |
| 8,806,176 B2 | 8/2014 | Branson et al. | |
| 9,015,339 B2 | 4/2015 | Branson et al. | |
| 9,021,122 B2 | 4/2015 | Branson et al. | |
| 2012/0216014 A1 | 8/2012 | Branson et al. | |
| 2012/0218268 A1 * | 8/2012 | Accola | G06F 9/5011 345/440 |
| 2015/0254091 A1 | 9/2015 | Cao et al. | |
| 2016/0306842 A1 | 10/2016 | Barsness et al. | |
| 2016/0344793 A1 | 11/2016 | Fawcett | |

OTHER PUBLICATIONS

Branson, et al., "Field-Programmable Gate Array Cards in a Streaming Environment", U.S. Appl. No. 16/119,454, filed Aug. 31, 2018.
List of IBM Patents for Patent Applications Treated as related, Sep. 12, 2018. 2 pages.

* cited by examiner

Primary Examiner — Tuankhanh D Phan
(74) Attorney, Agent, or Firm — Robert J. Shatto

(57) ABSTRACT

A stream of tuples to be processed by a plurality of processing elements operating on one or more computer processors are received. A first stream operator that is configured to perform a first operation on the received stream of tuples is identified by monitoring one or more stream operators in an operator graph. The first stream operator is determined to be a target operator. A field-programmable-gate-array (FPGA) card is determined to be configurable to perform the first operation. The FPGA card is determined to be available to perform the first operation. The FPGA card is added to the operator graph.

15 Claims, 10 Drawing Sheets

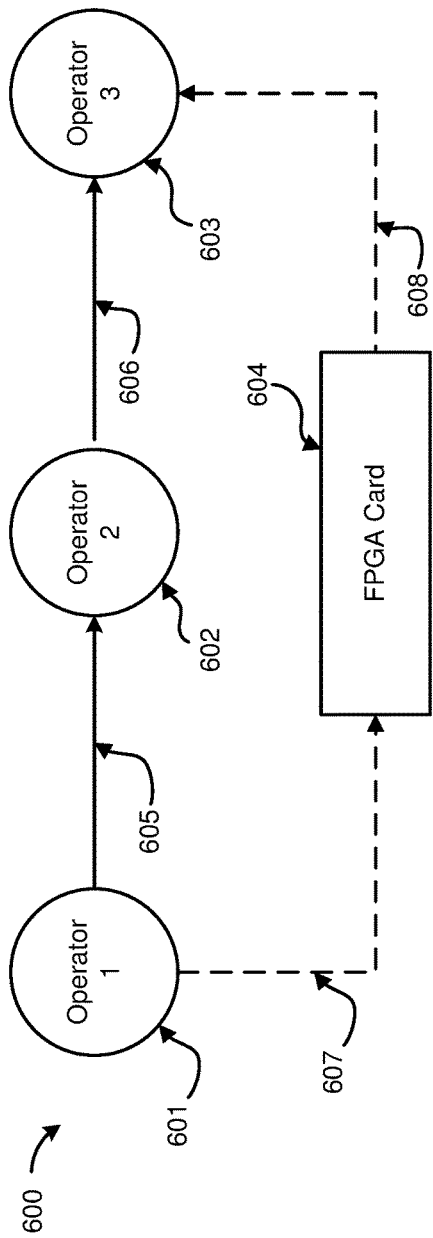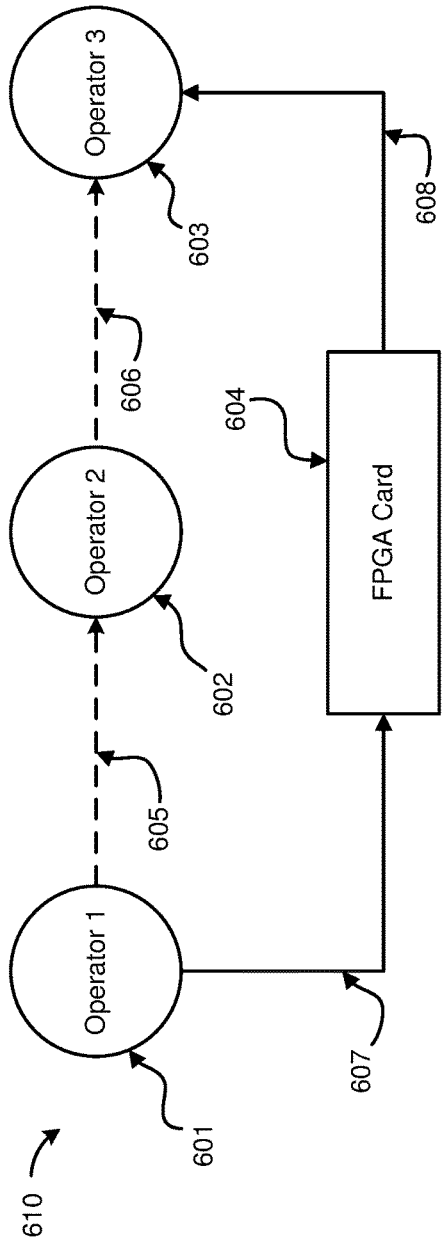

FIELD-PROGRAMMABLE GATE ARRAY CARDS IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

A field-programmable gate array (FPGA) is an integrated circuit that can include logic blocks. The logic blocks can include different gates and can be inter-wired in different configurations. The different configurations can be for performing different operations. Logic blocks can be configured to perform complex combinational functions, or merely simple logic gates like AND and XOR. The FPGA can be configured to use hardware description language (HDL).

SUMMARY

Embodiments of the disclosure provide a computer-implemented method, system, and computer program product for processing data. The method, system, and computer program product can receive a stream of tuples to be processed by a plurality of processing elements operating on one or more computer processors. The method, system, and computer program product can further include identifying a first stream operator that is configured to perform a first operation on the received stream of tuples by monitoring one or more stream operators in an operator graph. The method, system, and computer program product can further include determining that the first stream operator is a target operator. The method, system, and computer program product can further include determining that a field-programmable-gate-array (FPGA) card is configurable to perform the first operation. The method, system, and computer program product can further include determining that the FPGA card is available to perform the first operation. The method, system, and computer program product can further include adding the FPGA card to the operator graph.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 6A illustrates an operator graph for a stream computing application in which illustrative embodiments of the present disclosure may be implemented.

FIG. 6B illustrates an operator graph that includes a stream of tuple being rerouted to an FPGA card for a stream computing application in which illustrative embodiments of the present disclosure may be implemented.

DETAILED DESCRIPTION

Figure 1:
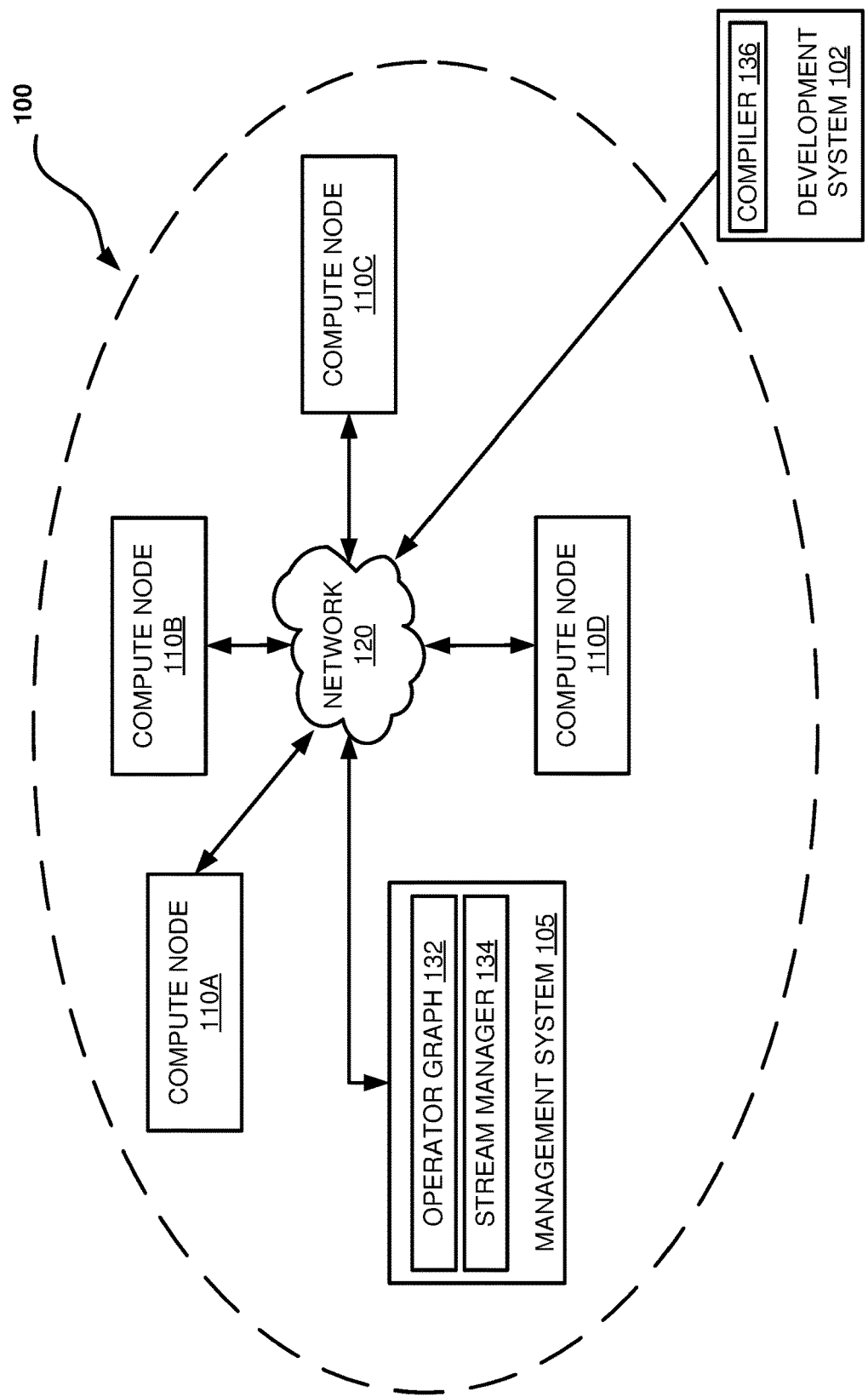
FIG. 1 illustrates a computing infrastructure configured to execute a stream computing application, according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them.

Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). This is referred to as a "dynamic connection" because both jobs are currently executing when they begin to share the data stream.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
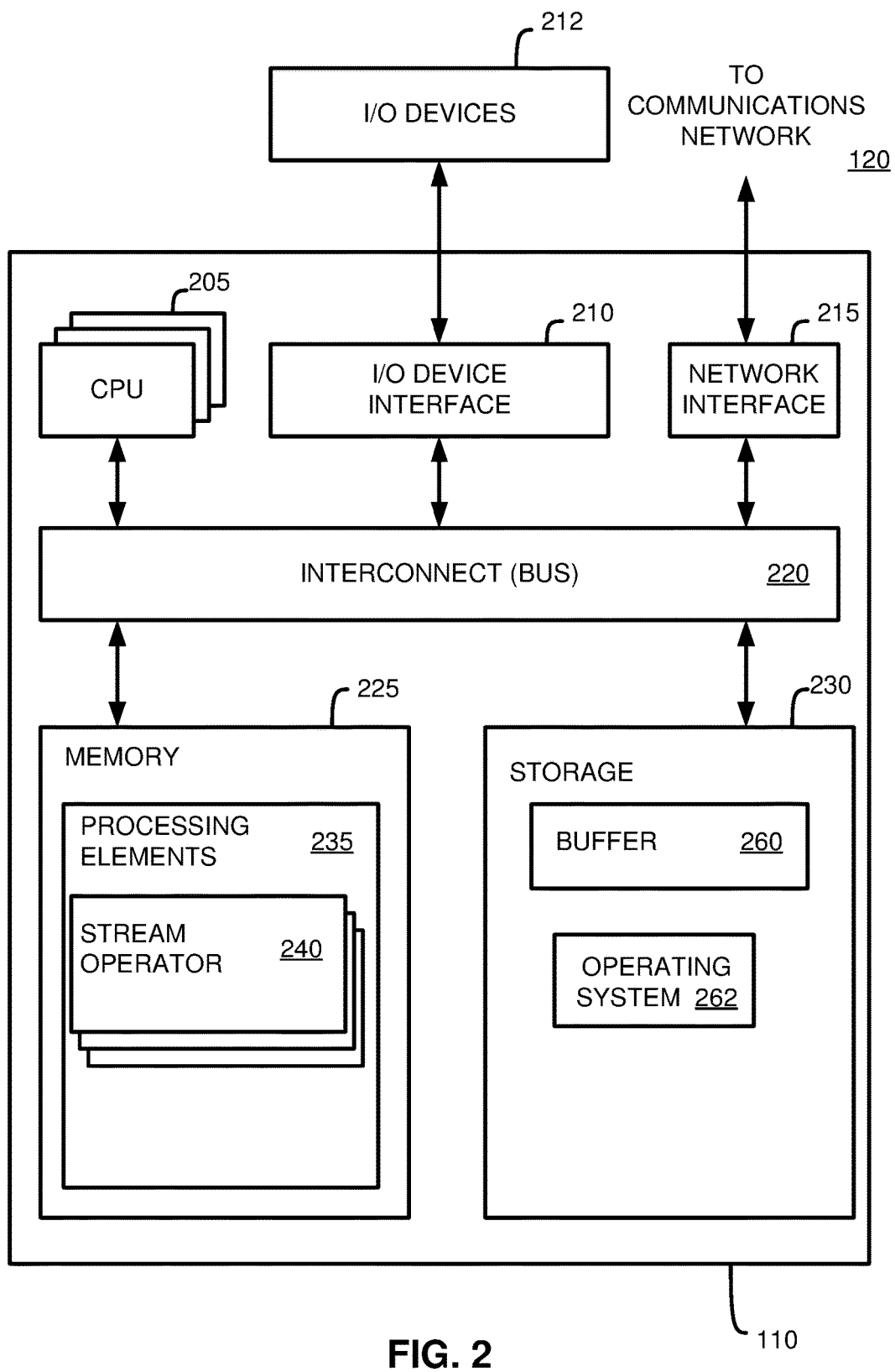
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
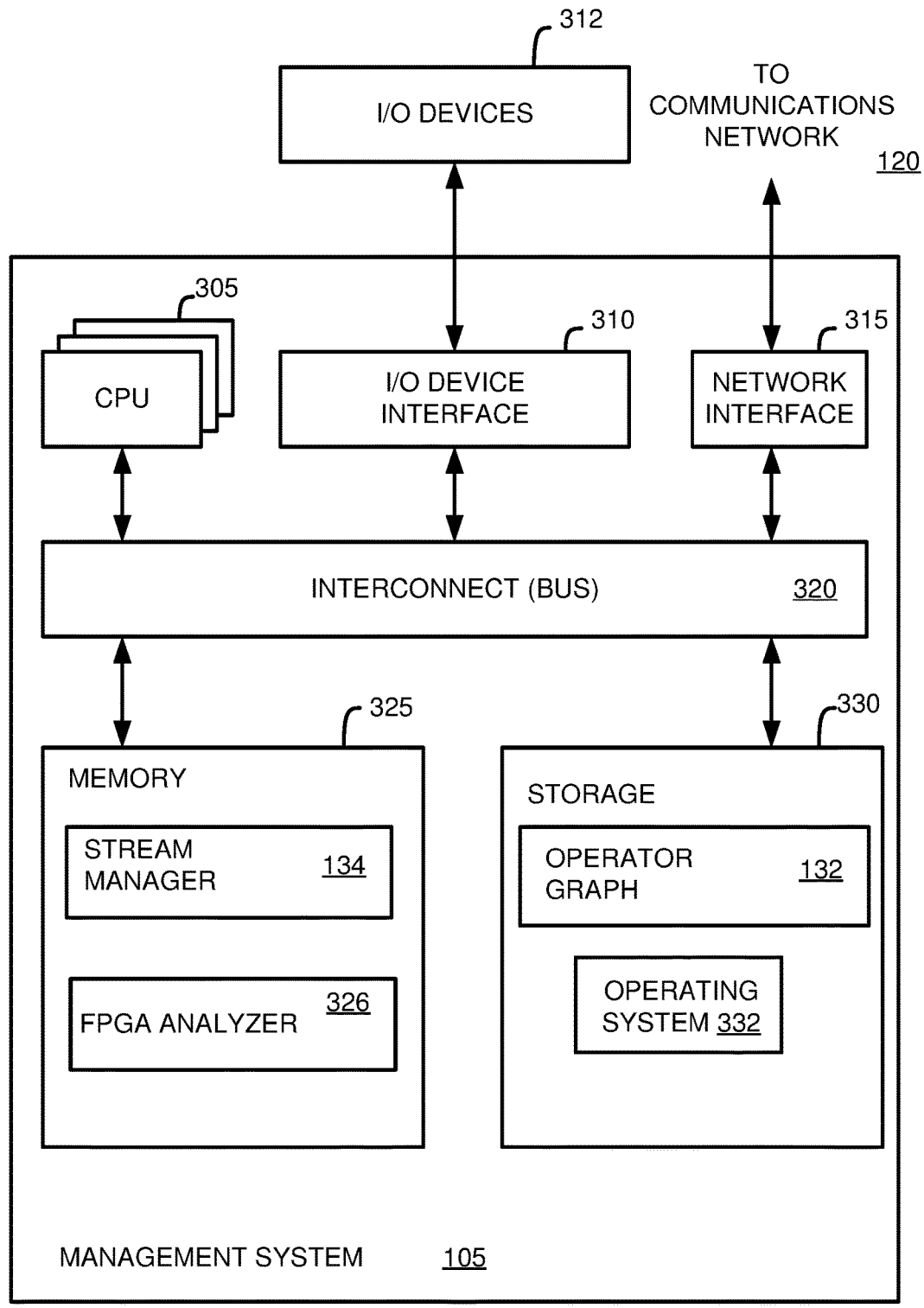
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing. In some embodiments, an FPGA may be implemented as an FPGA card having one or more integrated circuits on a printed circuit board. The FPGA card may be an expansion card that is configured to communicatively couple with other computer hardware components using an electrical connector or expansion slot on, for example, a computer motherboard, backplane, or riser card. For example, the FPGA card may connect to a computer system through a PCIe slot. The FPGA card may also include other hardware components, in addition to the FPGA, such as heat sinks and memory. For example, the FPGA card may include one or more FPGAs and a SRAM memory that is shared by the one or more FPGAs. The FPGA card can be configured to include I/O capability, such as an I/O mezzanine. The FPGA card can be configured to be compatible with several industry standard slot blades, blades, a motherboard, and mezzanine form factors. A field-programmable gate array (FPGA) analyzer 326 can configure an FPGA card to perform one or more operations on a stream of tuples. Configuring the FPGA card can be accomplished by organizing and modifying logic blocks within the FPGA card. The FPGA card can replace a stream operator in the operator graph 132. Replacing the stream operator may occur so that the stream of tuples can be processed more quickly. The FPGA analyzer 326 can coordinate with the stream manager 134 in order to determine where the FPGA card can be added to the operator graph 132.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
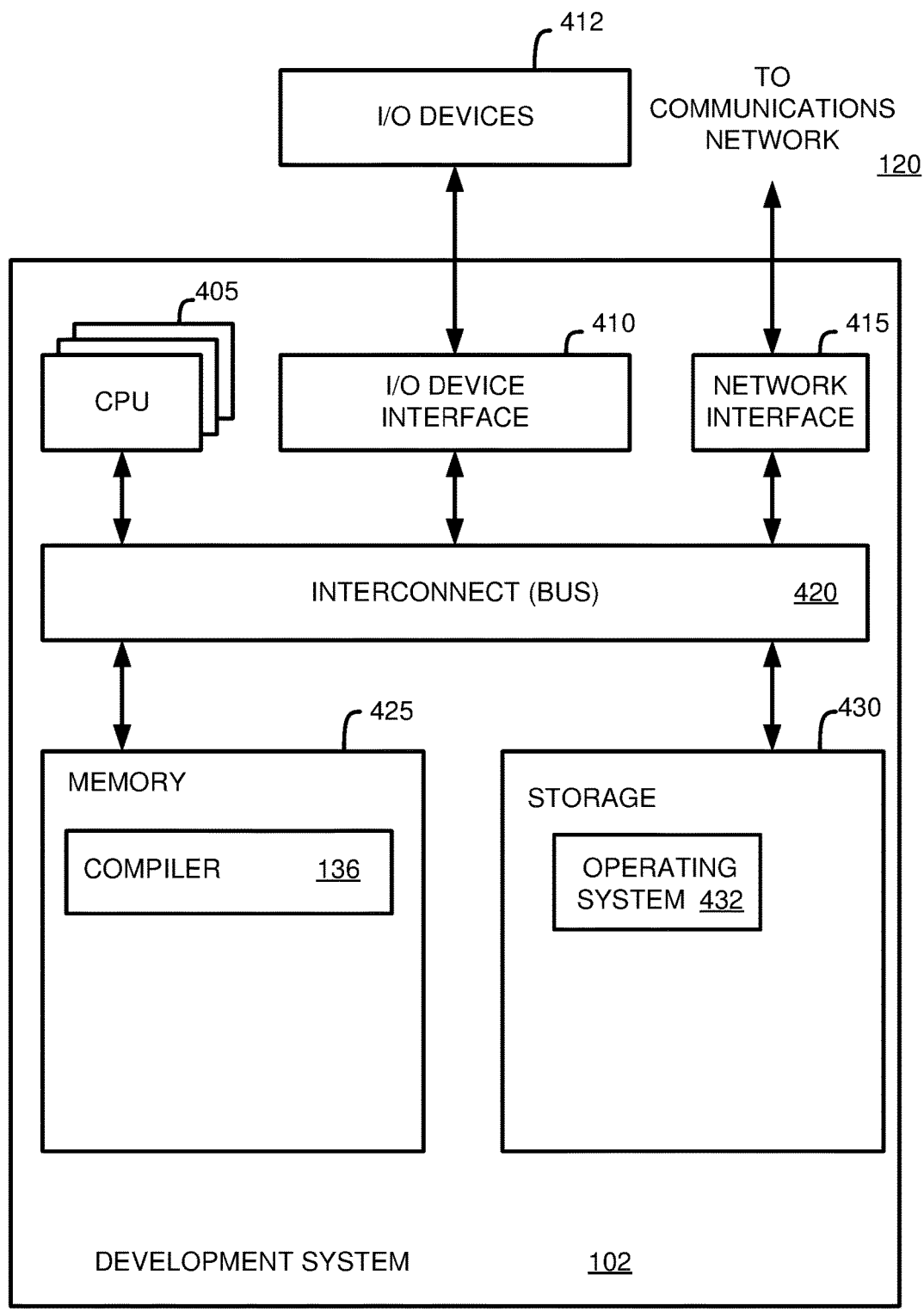
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
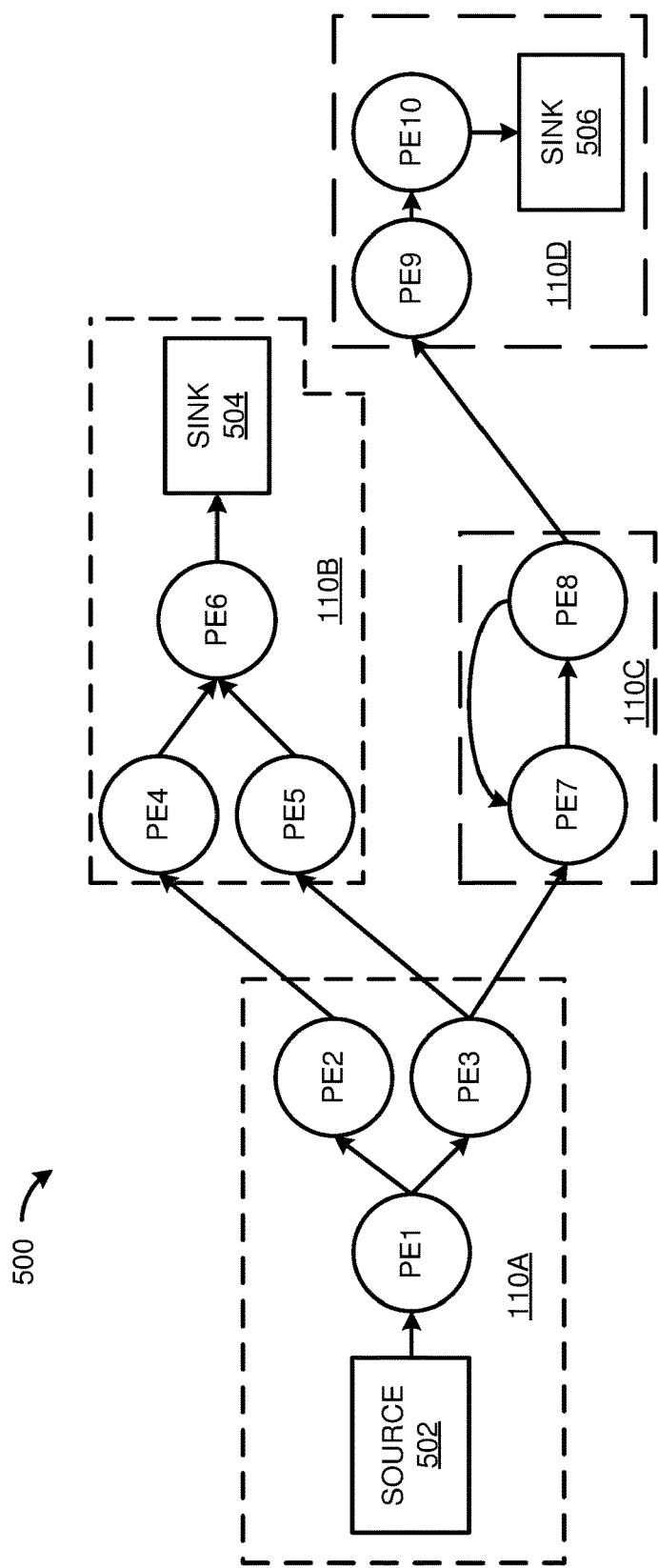
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity. In some cases, a field-programmable gate array (FPGA) card maybe used by an operator within an operator graph and can be configured to perform one or more operations that are performed by one or more stream operators that are within the operator graph.

Now turning to FIG. 6A, an operator graph 600 operating on a stream of tuples can be seen, according to embodiments of the present disclosure. In embodiments, the operator graph 600 can include a first operator 601, a second operator 602, and a third operator 603. The operator graph can include more or fewer stream operators than are currently shown. The first operator 601, second operator 602, and third operator 603 can perform a first operation, a second operation, and a third operation, respectively, on a stream of tuples. The stream of tuples can be received by the first stream operator 601. Once the first stream operator 601 has performed the first operation, the stream of tuples can follow path 605 to the second stream operator 602 where the second operation can be performed. Following the second operation, the stream of tuples can follow path 606 to the third stream operator 603 where the third operation can be performed on the stream of tuples.

In embodiments, path 607 is an alternate path that the stream of tuples can take. In embodiments, path 607 leads to a field-programmable gate array (FPGA) card 604. In embodiments, the FPGA card 604 could perform the second operation on the stream of tuples rather than the second stream operator 602. Once the FPGA card 604 has performed the second operation on the stream of tuples, the stream of tuples could follow alternate path 608 to the third stream operator 603. The stream of tuples can be rerouted to the alternate path 607 when an operator (e.g., the second stream operator 602) has exceeded a back pressure threshold or a CPU threshold.

In some cases the stream manager 134 can identify back pressure at an operator, e.g., second stream operator 602. Back pressure can be a buildup of tuples at a stream operator caused by the stream operator being unable to process the tuples at a rate at or more quickly than a rate that the stream of tuples is entering the stream operator. Back pressure can cause a delay in processing the stream of tuples, and, consequently, delay a job (e.g., an application) from executing. The stream manager can determine when a back pressure threshold has been exceeded. The back pressure threshold can be set by a user, a computer, or the stream manager. The stream manager 134 can also identify that a stream operator is performing an operation on a stream of tuples at a high CPU utilization (e.g., a CPU utilization that is nearing a normal operating capacity or above a threshold). This could also lead to a job being delayed. The stream manager can determine that a CPU threshold has been exceeded. The CPU threshold can be set by a user, a computer, or the stream manager.

In embodiments, a FPGA analyzer can identify a FPGA card 604 that is available to perform the second operation on the stream of tuples. In embodiments, the FPGA card 604 can be added into the operator graph 600 to relieve the workload of the second stream operator 602 by performing the second operation on the stream of tuples. In embodiments, the workload can be relieved by splitting the workload between a stream operator (e.g., second stream operator 602) and the FPGA card 604, or by rerouting the stream of tuples entirely from the first stream operator 601 to the FPGA card 604, rather than having the second stream operator 602 perform the second operation on the stream of tuples. In some embodiments, the stream of tuples can be split when the processed tuples do not need to be stored in memory. For example, when the stream of tuples does not need to be saved in memory, then the FPGA can perform an operation without saving information pertaining to the processed stream of tuples. In some embodiments, the FPGA card can include memory that can store information pertaining to the processed stream. In some embodiments, the second operator and the FPGA card can include a shared memory so that the stream of tuples can be split. Storing information of processed tuples can be beneficial when trying to figure out why back pressure or a high CPU utilization is occurring.

Turning now to FIG. 6B, a diagram 610 of a stream of tuples following an alternative path from a first stream operator 601 to a field-programmable gate array (FPGA) card 604 can be seen, according to embodiments of the disclosure. In embodiments, the stream of tuples can follow path 607 to the FPGA card 604 rather than following path 605. This can be due to the second stream operator 602 exceeding a CPU threshold or exceeding a back pressure threshold. The FPGA card 604 can perform the second operation on the stream of tuples. The FPGA card 604 can be preconfigured or be configured by a FPGA card analyzer 326 to perform the second operation. In embodiments, once the FPGA card 604 has performed the second operation on the stream of tuples, the stream of tuples can proceed along path 608 to the third stream operator 608, rather than taking path 606. In embodiments, the FPGA card 604 can be configured prior to performing an operation by the FPGA analyzer 326. This can be done by the FPGA analyzer 326 rearranging and rewiring logic blocks within the FPGA card 604, as discussed further in FIG. 8. This can be performed far in advance or just prior to the FPGA performing the second operation.

Figure 7:
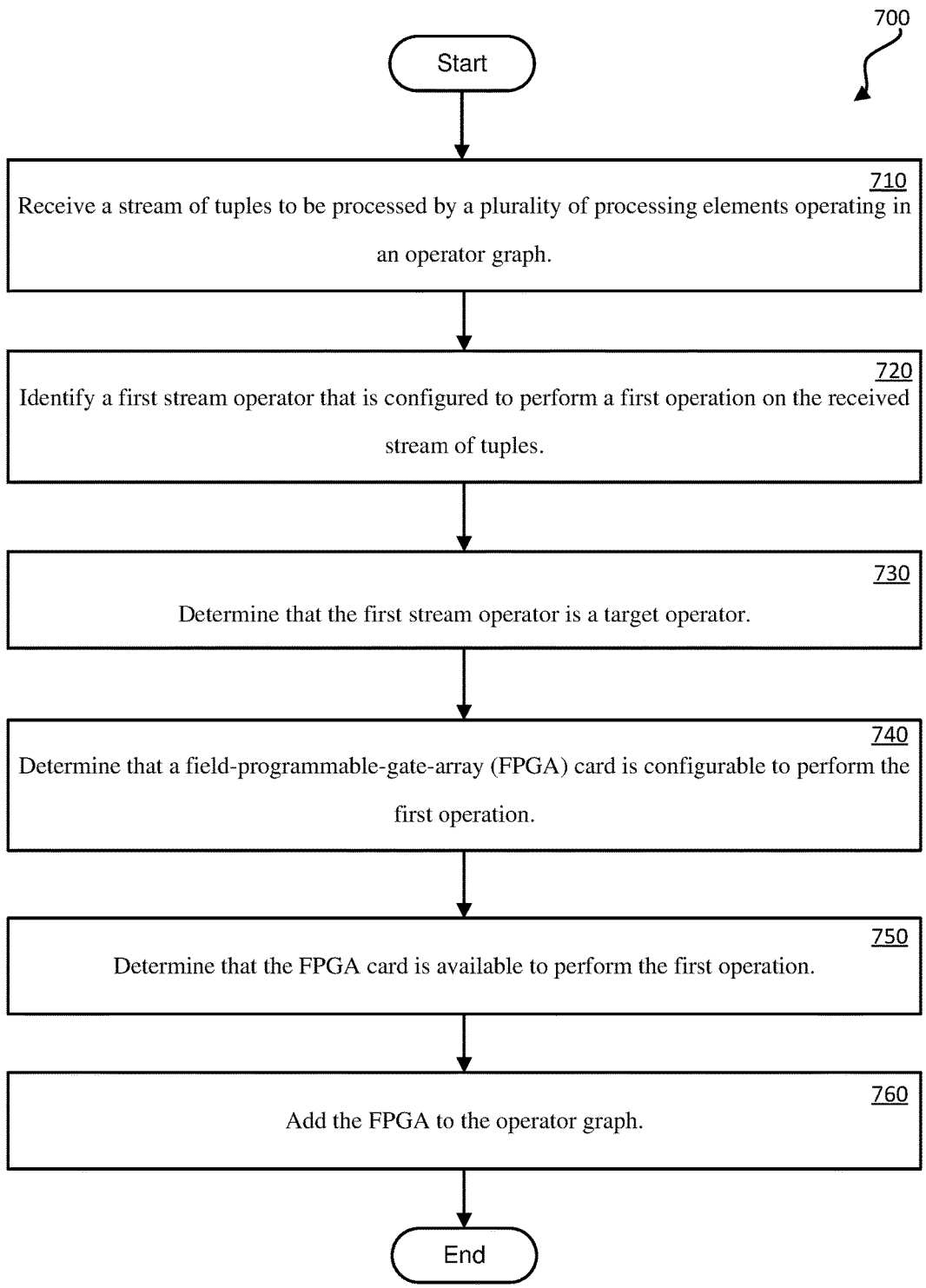
FIG. 7 illustrates a flow chart of a method of identifying a target operator and adding an FPGA card to perform an operation of the target operator on a stream of tuples, in accordance with embodiments of the present disclosure.

Now turning to FIG. 7, a method 700 for identifying a target operator (the second stream operator 602) and adding a field-programmable gate array (FPGA) card to perform an operation (the second operation) of the target operator on a stream of tuples can be seen, according to embodiments of the present disclosure. In some embodiments, the method 700 can include, in operation 710, receiving a stream of tuples to be processed by a plurality of processing elements operating in an operator graph. In embodiments, the processing elements can include one or more stream operators, e.g., first stream operator 601, second stream operator 602, and third stream operator 603. In some embodiments, the one or more stream operators can be operating on a processor, or can be operating on more than one processor. For example, a first stream operator can be operating on a first processor that is configured to perform a first operation, and a second stream operator can be operating on a second processor that is configured to perform a second operation. In embodiments, once the stream of tuples has been received by the first stream operator, the method 700 can proceed to operation 720.

In embodiments, the method can include, in operation 720, identifying the first stream operator that is configured to perform a first operation on the received stream of tuples. In embodiments, the first stream operator may not physically be the first stream operator in the operator graph. For example, the first stream operator can physically be a second or third stream operator that performs a second or third operation, respectively, on the stream of tuples. In some embodiments, the first stream operator can perform a last operation on the stream of tuples in the operator graph. Identifying the first stream operator can include identifying a back pressure of the first stream operator. The back pressure of the first stream operator can be due to the first stream operator not performing the first operation on the stream of tuples quickly enough, thereby causing a buildup of tuples. Identifying the first stream operator can also include identifying a CPU utilization of the first stream operator. The CPU utilization can be the level of processing power by the first stream operator. A CPU utilization of one-hundred percent can mean that the first stream operator may not be able to perform the first operation on the stream of tuples at a quicker rate than a rate at which it is currently operating. The identifying can be achieved by a stream manager, e.g., stream manager 134. In embodiments, once the first stream operator is identified, the method 700 can proceed to an operation 730.

In embodiments, the method 700 can include, in operation 730 determining that the first stream operator is a target operator. In embodiments, this can include determining that the first stream operator has exceeded a back pressure threshold or a CPU utilization threshold. In embodiments, the back pressure threshold and the CPU threshold can be determined (e.g., set) by the stream manager, e.g., stream manager 134. Determining that the first stream operator has exceeded a threshold can be achieved by comparing the first stream operator to other operators in the operator graph. In embodiments, the threshold can be exceeded by a stream operator having the highest back pressure or the highest CPU utilization in the operator graph.

At operation 730 the stream manager may monitor one or more performance indicators which may measure the performance of the operators, processing elements, or the computer hardware on which the operators and/or processing elements run. For example, in some embodiments, the stream manager may measure the tuple rate flowing out of an operator. In other embodiments, the stream manager may monitor the tuple rate flowing into an operator.

In other embodiments, the stream manager may monitor the buffer utilization of one or more stream operators. For example, the stream manager may monitor how much space is being used in a stream operator's input buffer. If the input buffer is almost full, this may indicate that the stream operator is unable to process tuples as fast as they are received. This may result in back pressure, thereby affecting the performance of other stream operators in the stream.

Similarly, in some embodiments, the stream manager may monitor the back pressure experienced by stream operators that are upstream from a first stream operator. For example, the stream manager may monitor the utilization of output buffers. If these buffers are full—i.e., the destination operator's buffer is already full, and thus, cannot accept more data tuples—this may indicate that the performance of the stream is decreasing.

In some embodiments, the stream manager may monitor performance indicators associated with the computer hardware that hosts the operators of the jobs (i.e., the nodes). For example, instead of measuring statistics associated with stream operators like the tuple rate, the stream manager may monitor the performance metrics of the computer hardware the stream operators use to process the tuples in the data stream. Different types of metrics that the stream manager may monitor include CPU utilization, bus utilization, memory utilization, and network traffic. If these hardware resources are being used at high levels (e.g., greater than 90% of their maximum load), it may indicate that the resources cannot keep up with the processing demands made by the operators.

For example, if the second stream operator uses TCP/IP to transmit its data stream to a plurality of dynamically connected jobs, the stream manager may monitor the TCP/IP network interface on the compute node that hosts the second stream operator. If the buffers associated with the network interface are full, the network interface may be unable to transmit data tuples fast enough to all the different dynamically connected jobs. Similarly, the stream manager may monitor the usage of the bus 220 (shown in FIG. 2) which may be used for intra-nodal communication. If the bus 220 is congested—i.e., applications must wait to gain access to the bus 220—this may indicate that there is a back pressure.

In other embodiments, the stream manager may compare the CPU utilization percentage to a predetermined CPU threshold. If the CPU utilization is above the CPU threshold, the stream manager may determine that back pressure is present. The associated threshold may be determined by the stream operator or may be configurable by a user. In still other embodiments, the rate of change in the tuple rate or the CPU utilization may be compared to a CPU threshold. For example, if the CPU utilization increased from 50% to 65% over a certain time period, this rate of change may exceed a threshold set by an administrator, and thus, indicate that performance is deteriorating and back pressure is present. Advantageously, monitoring the rate at which these performance indicators change may help to predict performance issues before the throughput of the data streams is affected. That is, the stream computing application may currently be able to satisfy the demands of the jobs, but if the CPU utilization rate continues to climb, the throughput may begin to decrease. In some embodiments, once the target operator has been determined, the method 700 can proceed to an operation 740.

In embodiments, the method 700 can include, in operation 740, determining that a FPGA card (e.g., FPGA card 604) is configurable to perform the first operation. In embodiments, the stream manager 134 can communicate with the FPGA analyzer 326 that the first operation can be performed by the FPGA card. In embodiments, the FPGA analyzer 326 can identify an FPGA card can then determine that the FPGA card can perform the first operation. In embodiments, the determining can be accomplished by analyzing logic blocks within the FPGA card. In some embodiments, the logic blocks within the FPGA card may not be preconfigured to perform the first operation, but the FPGA analyzer 326 can configure the logic blocks to perform the first operation.

When the first stream operator is compiled in a way that supports FPGA cards, then the stream manager may send the code to the FPGA analyzer. The FPGA analyzer can then use the code to configure the FPGA card to perform the first operation. For example, the stream manager can look at whether the first stream operator is compiled in a language (or using libraries) that supports FPGA cards, e.g. Compute Unified Device Architecture (CUDA). CUDA is a parallel computing platform and application programming interface (API) model. As another example, the computing environment that is hosting the streaming environment can have a repository of predetermined HDL code for specific, common functions (e.g., join functions). The stream manager could check a repository for the HDL code and, if found, can send it to the FPGA Analyzer. Yet another example, the stream manager could also use code analyzers in order to convert the first stream operator's code into HDL or pseudo-HDL. Finally, the determining can also include determining that the FPGA is already configured to perform the first stream operation. In embodiments, once the FPGA card has been determined to be configurable to perform the first operation, the method 700 can proceed from operation 740 to an operation 750.

In embodiments, operation 750 can include determining that the FPGA card is available to perform the first operation. The determining can be achieved by a FPGA analyzer, (FPGA analyzer 326) analyzing the logic blocks within the FPGA card then determining that there are sufficient logic blocks to perform the first operation. The determining can also include the FPGA analyzer determining that a wiring layout of the FPGA includes sufficient wiring to perform the first operation. The FPGA analyzer could determine how many logic blocks are needed to perform the first operation, and then compare it to the number of available blocks. The logic blocks could be performing other operations or they could not be in use. The FPGA analyzer could free up logic blocks that are performing other operations so that the first operation could be performed. This could be the case when the first operation has a higher priority than the other operations. The higher priority can be determined based on finishing an application within a time frame. In embodiments, once the availability of the FPGA card has been determined, operation 750 can proceed to an operation 760.

In embodiments, operation 760 can include adding the FPGA card to the operator graph (operator graph 600). In embodiments, the adding the FPGA card to the operator graph can include rerouting the stream of tuples from the first stream operator (target operator) to the FPGA card so that the FPGA card can perform the first operation on the stream of tuples as described in FIG. 6A and FIG. 6B, and also so that the stream of tuples bypasses the target operator. Rerouting the stream of tuples can alternatively include splitting the stream of tuples between the target operator and the FPGA card. In embodiments, the stream of tuples can proceed on a route, e.g., route 608 from the FPGA card to a stream operator that is next in line in the operator graph after the target stream operator. In embodiments, once operation 760 has added the FPGA card into the operator graph, the method 700 can conclude.

Figure 8:
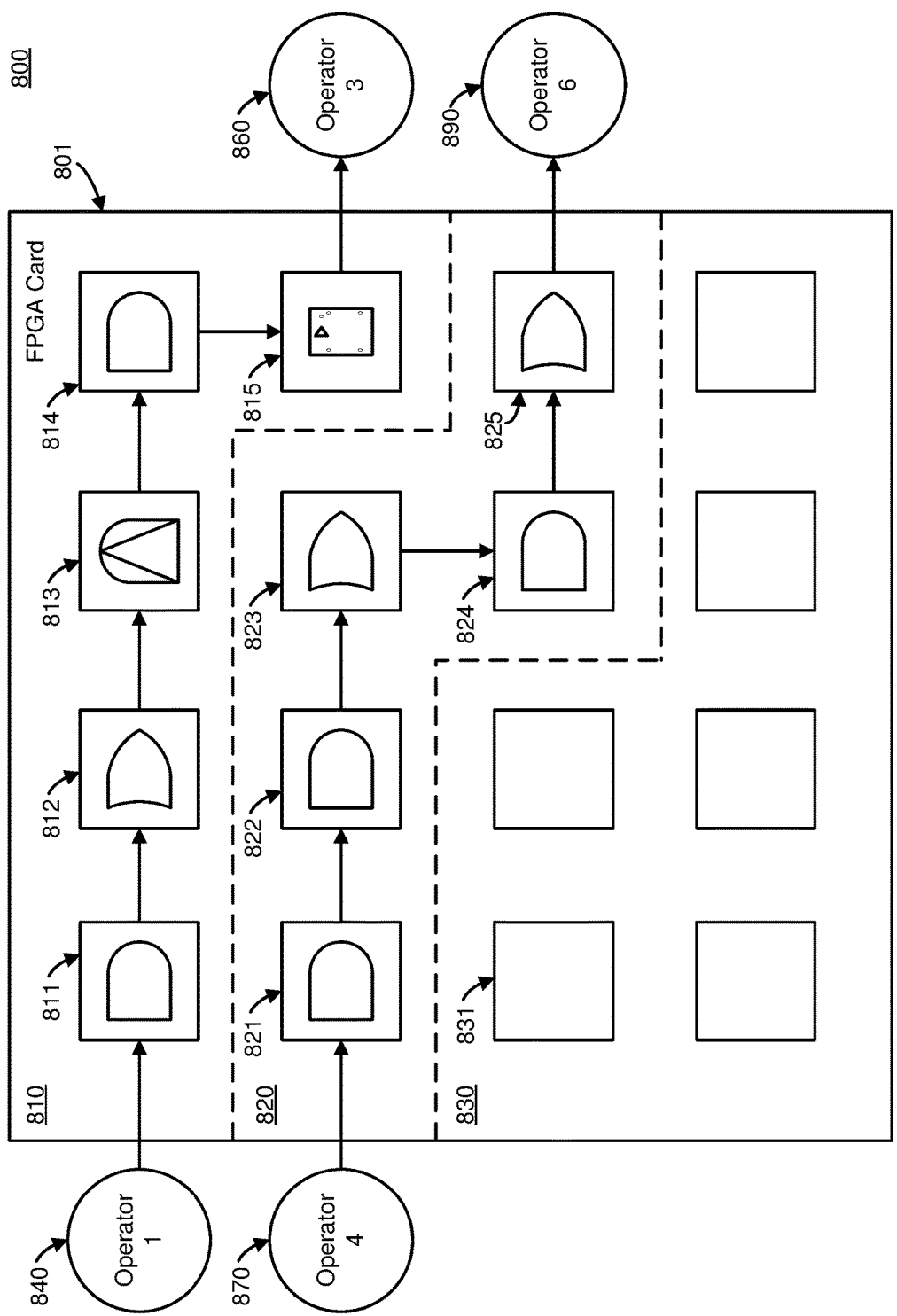
FIG. 8 illustrates an FPGA that can include several logic blocks that are partitioned into subsections according to a set of operations that can be performed on one or more streams of tuples, in accordance with embodiments of the present disclosure.

Turning now to FIG. 8, a visual representation 800 of one or more streams of tuples being received within a field-programmable gate array (FPGA) card 801 can be seen, according to some embodiments. A first stream of tuples could be entering a first portion 810 of the FPGA card 801 from a first operator 840. The first portion 810 can include one or more logic blocks 811-815. In embodiments, the one or more logic blocks 811-815 could be preconfigured by a FPGA analyzer, e.g., FPGA analyzer 326, to perform an operation on the entering stream of tuples. In embodiments, the logic blocks can be configured to be various logic gates that are needed in order to perform an operation on a stream of tuples. The logic blocks can be configured to be, for example, an AND gate 811 and 814, an OR gate 812, Vertical XOR gate 813. A logic block can also be configured to be an amplifier, such as an Or Amplifier 815. In some embodiments, logic blocks can be configured in any order necessary to perform an operation. In embodiments, the first stream of tuples could exit from logic block 815 and enter into a third stream operator 860. In embodiments, the FPGA card can be configured to be added into one or more operator graphs, and thus be configured to receive one or more streams of tuples.

In embodiments, a second stream of tuples can be received by a second portion 820 of the FPGA card 801. In embodiments, the second stream of tuples could be received from a fourth operator 870. In some embodiments, the fourth stream operator 870 can be included in a same operator graph as the first stream operator 840, or in another operator graph. In embodiments, the second portion 820 of the FPGA card 801 can include one or more logic blocks 821-825. In embodiments, the one or more logic blocks 821-825 could be preconfigured, by a FPGA analyzer (FPGA analyzer 326), to perform an operation on the entering second stream of tuples. In embodiments, the logic blocks can be configured to be various logic gates that can be necessary in order to perform an operation on a stream of tuples, such as an AND gate 821, 822, and 824, and OR gates 823 and 825. The logic block configurations are not limited to logic blocks embodied within the diagram 800. In some embodiments, logic blocks can be configured in any order necessary and any configuration in order to perform an operation. In embodiments, the second stream of tuples could exit from logic block 825 and enter into a sixth stream operator 890.

In certain embodiments, a third portion 830 can include several available logic blocks, e.g., logic block 831, that are not being used to perform an operation. In embodiments, logic blocks within the third portion 830 can be modified and partitioned so that the FPGA card 810 can perform one or more operations on one or more additional streams of tuples.

Figure 9:
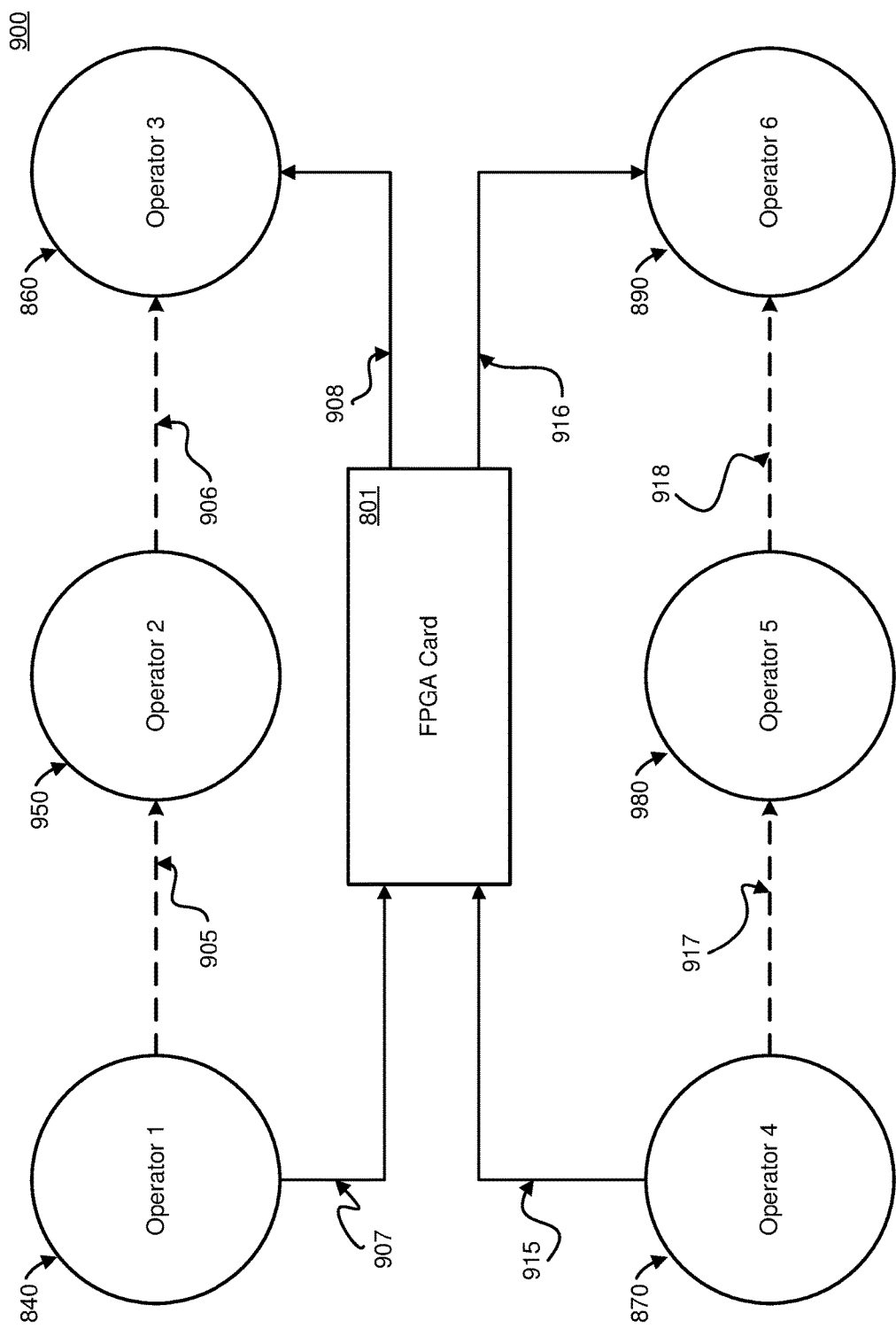
FIG. 9 illustrates an FPGA card being added to two operator graphs performing a first operation and a second operation on a first stream of tuples and a second stream of tuples, respectively, in accordance with embodiments of the present disclosure.

Turning now to FIG. 9, a diagram 900 illustrating a field-programmable gate array (FPGA) card 801 being added to two operator graphs can be seen, according to embodiments. In embodiments, a first operator graph can include a first stream operator 840 configured to perform a first operation on a first stream of tuples, a second stream operator 950 configured to perform a second operation on the first stream of tuples, and a third stream operator 860 configured to perform a third operation on the first stream of tuples. The FPGA card 801 can be added into the first operator graph because, e.g., the second stream operator 950 exceeded a back pressure threshold or exceeded a CPU threshold. The adding of the FPGA card to the first operator graph can be achieved by a stream manager, e.g., stream manager 124. In embodiments, the stream manager can reroute a first stream of tuples from path 905 that can lead to the second stream operator 950 to path 907 that can lead to the FPGA card 801.

In embodiments, the stream manager can also split the first stream of tuples between the second stream operator 950 and the FPGA card 801 in order to relieve a workload of the second stream operator 950. For example, a first portion of the stream of tuples can be sent to the second stream operator 950, and a second portion can be sent along path 907 to the FPGA card. Then the second stream operator 950 and the FPGA card can each perform the second operation on their portions of the stream of tuples. Then the second stream operator 950 can output its processed portion of the stream along path 906 to the third stream operator 860 and the FPGA card can output its portion along path 908 to the third stream operator 860.

In embodiments, a second operator graph can include a fourth stream operator 870, a fifth stream operator 980, and a sixth stream operator 890 that can perform a fourth operation, a fifth operation, and a sixth operation, respectively. In embodiments, the FPGA card 801 can be added into the second operator graph because, e.g., the fifth stream operator 980 exceeded a back pressure threshold or exceeded a CPU threshold. The adding of the FPGA card to the second operator graph can be achieved by a stream manager, e.g., stream manager 124. In some embodiments, the stream manager could replace the FPGA card 801 with the fifth stream operator 980. In some embodiments, the FPGA card 801 can be included concurrently in the first operator graph and the second operator graph. In embodiments, the stream manager can reroute a second stream of tuples from path 917 that can lead to the fifth stream operator 980 to path 915 that can lead to the FPGA card 801. In embodiments, the stream manager can also split the second stream of tuples between the fifth stream operator 980 and the FPGA card 801 in order to reduce a workload of the fifth stream operator 980. As discussed above with the splitting, a third portion of the stream of tuples can be sent to the FPGA card 801 and a fourth portion of the stream of tuples can be sent to the fifth operator 980. In embodiments, the FPGA card 801 can perform a fifth operation on the second stream of tuples. The second stream of tuples can be outputted from the FPGA card 801 and the second stream of tuples can follow path 916 that leads to the sixth stream operator 890, rather than follow path 918 from the fifth operator 980 to the sixth operator 890.

In embodiments, in order to perform the second operation and the fifth operation on the first stream of tuples and the second stream of tuples, respectively, the logic blocks can be partitioned substantially similar to that shown in diagram 800. In some embodiments, the FPGA card 801 can be added to more operator graphs than the first operator graph and the second operator graph. In some embodiments, the FPGA card 801 can perform more than one operation within a single operator graph. For example, the FPGA card 801 could perform the first operation and the second operation in the first operator graph. In some embodiments, the FPGA card 801 can perform more than one operation in a first operator graph while performing one or more operations in a second operator graph. For example, the FPGA card 801 could perform the first operation, second operation, fourth operation, and fifth operation concurrently (e.g., in parallel). The quantity of operator graphs that the FPGA card 801 can be added to depends on the availability of the logic blocks within the FPGA card 801.

In some cases, the first stream operator may not be adjacent to the second stream operator. In this case, a first rerouting can occur from a stream operator that is preceding the first stream operator to the FPGA card. Then the stream of tuples can be routed to a stream operator that is located between the first stream operator and the second stream operator. A second rerouting of the stream of tuples to the FPGA card can occur following the in between operator to perform an operation. Finally the stream of tuples can be redirected back into the operator graph following the FPGA card performing a second operation. This rerouting can occur for any permutation of adding in the FPGA card into the operator graph.

Figure 10:
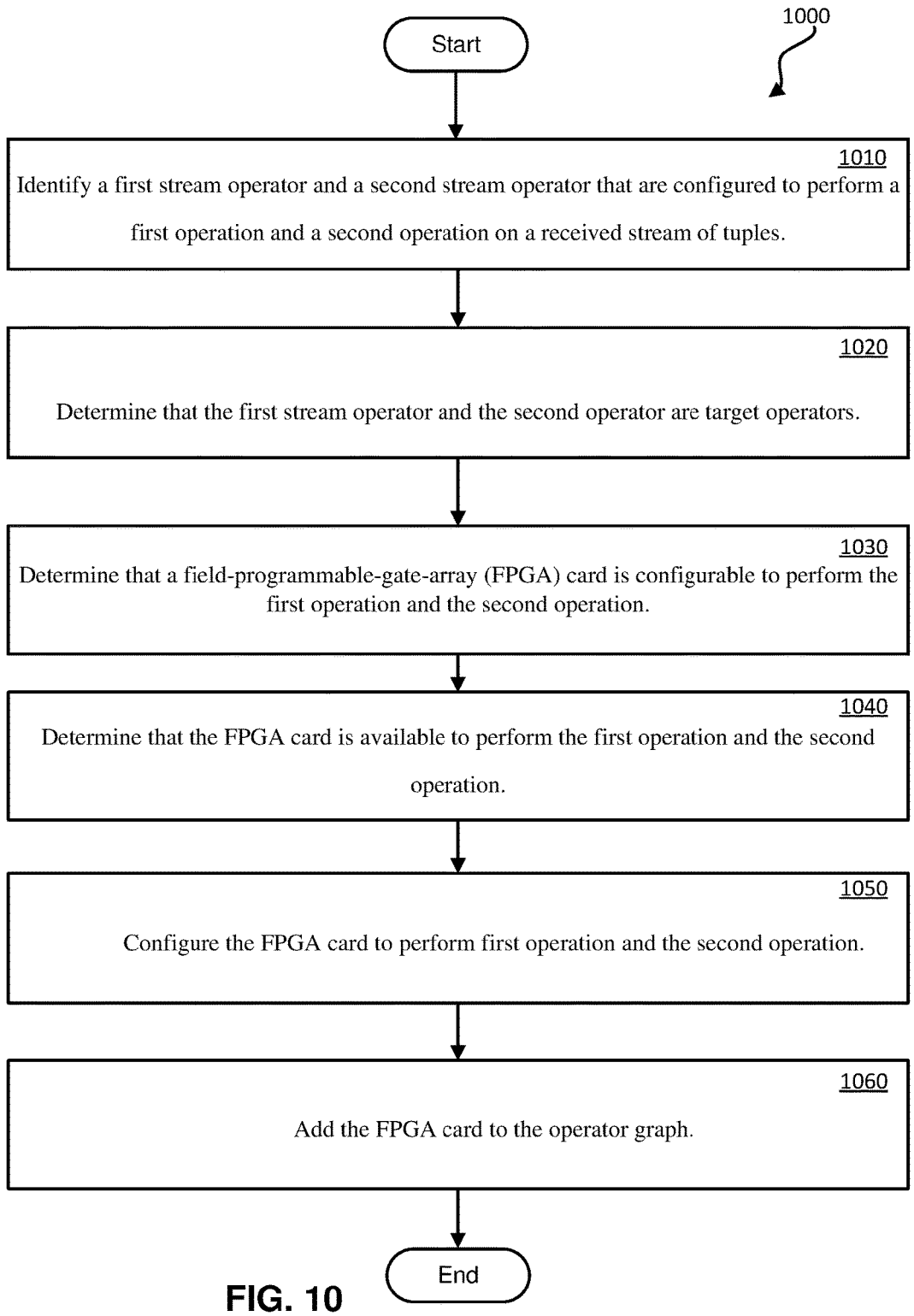
FIG. 10 illustrates a flow chart of a method of an FPGA card being configured to perform one or more operations on one or more streams of tuples, in accordance with embodiments of the present disclosure.

Now turning to FIG. 10, a method 1000 of adding a FPGA card (e.g., FPGA card 801) into an operator graph in order to perform two operations can be seen, according to embodiments. In embodiments, the method 1000 can include, in operation 1010, identifying a first stream operator and a second stream operator that can both be included in an operator graph. The first stream operator and the second stream operator can be configured to perform a first operation and a second operation, respectively, on a received stream of tuples. Identifying the first stream operator and the second stream operator can include a stream manager identifying a back pressure or a CPU utilization of both stream operators. In embodiments, the back pressure or CPU utilization for both stream operators could be slowing down the rate at which the stream of tuples is being processed, thus both operators could be exceeding a back pressure threshold or a CPU threshold. In embodiments, once the first stream operator and the second stream operator have been identified, the operation 1010 can proceed to operation 1020.

In embodiments, operation 1020 can include determining that the first stream operator and the second operator are target operators. The determining that both stream operators are target operators can be substantially similar to determining a target operator in operation 730, as described in FIG. 7. This can mean that both the first stream operator and the second stream operator could have exceeded a back pressure threshold or a CPU threshold. Determining a target operator can also be based on how effective replacing a stream operator with an FPGA card could be for increasing the speed of processing the stream of tuples. In some cases, the target operator may not have exceeded a back pressure threshold or a CPU threshold. In some cases, a target operator can be the stream operator with a second or third highest back pressure or CPU utilization. This may be due to a proximity of the FPGA card to a particular stream operator that has the highest back pressure, or due to the available logic blocks within the FPGA card. Stream operators can operate on different nodes, and an FPGA card can be located on a node that does not include the target operator. In some cases, a stream operator that has the highest back pressure or CPU utilization may be operating on a different node than the FPGA card. Accordingly, replacing the stream operator with the FPGA card may not improve the processing speed of the stream computing application. In these cases, replacing the target operator with a third highest back pressures that can be located on a same node as an FPGA card could improve processing speed more than replacing the stream operator with the highest CPU utilization or backpressure. In embodiments, once the first operator and the second operator have been determined to be target operators, operation 1020 can proceed to operation 1030.

In embodiments, operation 1030 can include determining that a FPGA card is configurable to perform the first operation and the second operation. In embodiments, determining that the FPGA card is configurable can include determining that the hardware and the logic blocks are capable of performing the two operations. This determining can be achieved by a stream manager or an FPGA analyzer. In embodiments, more than one FPGA card can be determined to be configurable and the stream manager can pick an FPGA card of the one or more FPGA cards that could improve processing efficiency more than the other FPGAs. The stream manager can determine this based on distance from target operator and how many logic blocks are available to use for performing an operation. In some cases, the FPGA card can be preconfigured to perform the two operations. In some cases, the FPGA analyzer can configure the logic blocks to perform the two operations. Once the FPGA card has been determined to be capable of performing the two operations, the operation 1030 can proceed to an operation 1040.

In embodiments, operation 1040 can include determining that the FPGA card is available to perform the first operation and the second operation. In some embodiments, the stream manager can identify an FPGA card that is available. In embodiments, available can mean that the FPGA card has available logic blocks to perform the first operation and the second operation. In some cases, the FPGA card may be performing several operations and not have any free logic blocks. In some cases, an FPGA analyzer, e.g. FPGA analyzer 326, can free up logic blocks that are currently being used so that the FPGA card can perform the two operations. In some cases, the FPGA card can be preconfigured to perform the two operations. In some cases, the FPGA analyzer can configure the logic blocks to perform the two operations. In embodiments, the once the FPGA card has been determined to be configurable to perform the first operation and the second operations, operation 1040 can proceed to operation 1050.

In embodiments, operation 1050 can include configuring the FPGA card to perform the first operation and the second operation. Configuring can include rearranging or modifying one or more logic blocks within the FPGA card so that the two operations can be performed concurrently. In embodiments, FIG. 8 can illustrate an embodiment of a possible configuration for performing a first operation and a second operation. The configuring can be achieved by a stream manager or an FPGA analyzer. In some cases, more than one FPGA card may be needed in order to perform the two operations, thus two FPGA cards can share one or more operations. In embodiments, once the configuring has occurred, operation 1050 can proceed to an operation 1060.

In embodiments, operation 1060 can include adding the FPGA card to the operator graph. Adding the FPGA card to the operator graph can be achieved by a stream manager, e.g., stream manager 134. In embodiments, this can include replacing the first stream operator and the second stream operator with the FPGA card. This can also include rerouting a stream of tuples from the first operator to the FPGA card and can include rerouting the exiting stream of tuples from the FPGA card back into the operator graph, depending on where the second stream operator is located within the operator graph. For example, when the first stream operator is adjacent to the second stream operator, the stream of tuples may only be rerouted to the FPGA card once since the output of the first stream operator is an input of the second stream operator. In embodiments, once the FPGA card has been added into the operator graph in operation 1060, the method 1000 can conclude.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
receiving a stream of tuples to be processed by a plurality of processing elements operating on one or more computer processors;
identifying, by monitoring one or more stream operators in an operator graph, a first stream operator that is configured to perform a first operation on the received stream of tuples;
determining that the first stream operator is a target operator;
determining that a field-programmable-gate-array (FPGA) card is configurable to perform the first operation;
determining that the FPGA card is available to perform the first operation;
adding the FPGA card to the operator graph;
identifying a second stream operator in the operator graph that is configured to perform a second operation on a second stream of tuples;
determining that the FPGA card is available to perform the second operation;
configuring the FPGA card to perform the second operation;
removing the FPGA card from the operator graph;
adding, in response to the removing the FPGA card from the operator graph, the first stream operator into the operator graph;
removing, in response to the adding the first stream operator into the operator graph, the second stream operator from the operator graph; and
re-adding, in response to the removing the second stream operator from the operator graph, the FPGA card into the operator graph.

2. The method of claim 1, wherein the determining that the FPGA card is configurable to perform the first operation comprises determining that a code on the first stream operator that causes the first stream operator to perform the first operation is compiled in a language that is compatible with the FPGA card.

3. The method of claim 1, wherein the determining that the FPGA card is available to perform the first operation comprises determining that there are sufficient available logic blocks within the FPGA card to configure the FPGA card to perform the first operation.

4. The method of claim 1, the method further comprising:
splitting the stream of tuples into a first portion and a second portion between the first stream operator and the FPGA card; and
sending the first portion of the stream of tuples to the first stream operator and the second portion of the stream of tuples to the FPGA card.

5. The method of claim 1, wherein the adding the FPGA card to the operator graph comprises:
configuring the FPGA card to perform the first operation; and
replacing the first stream operator with the FPGA card.

6. The method of claim 1, wherein the determining that the first stream operator is the target operator comprises:
determining a back pressure of each of the one or more stream operators; and
determining that the back pressure first stream operator exceeds a first threshold.

7. The method of claim 1, wherein the determining that the first stream operator is the target operator comprises:
determining a CPU utilization of each of the one or more stream operators; and
determining that the CPU utilization of the first stream operator exceeds a threshold.

8. The method of claim 1, the method further comprising:
determining that inclusion of the FPGA card in the operator graph speeds up processing of a job,
wherein the adding the FPGA card is in response to the determining that the FPGA card speeds up processing of the job.

9. The method of claim 1 wherein the FPGA is further configurable to perform the first operation and the second operation in parallel.

10. A system comprising:
a plurality of processing elements to receive a stream of tuples, each processing element having one or more stream operators;
two or more processors; and
a memory containing an application that, when executed, causes at least one of the two or more processors to:
receive a stream of tuples to be processed by a plurality of processing elements operating on one or more computer processors;
identify, by monitoring one or more stream operators in an operator graph, a first stream operator that is configured to perform a first operation on the received stream of tuples;
determine that the first stream operator is a target operator;
determine that a field-programmable-gate-array (FPGA) card is configurable to perform the first operation;
determine that the FPGA card is available to perform the first operation;
add the FPGA card to the operator graph;
identify a second stream operator in the operator graph that is configured to perform a second operation on a second stream of tuples;
determine that the FPGA card is available to perform the second operation;
configuring the FPGA card to perform the second operation
remove the FPGA card from the operator graph;
add, in response to the removing the FPGA card from the operator graph, the first stream operator into the operator graph;
remove, in response to the adding the first stream operator into the operator graph, the second stream form the operator graph; and
re-add, in response to the removing the second stream operator from the operator graph, the FPGA card into the operator graph.

11. The system of claim 10, the application further causing the processor to:
split the stream of tuples into a first portion and a second portion between the first stream operator and the FPGA card; and
send the first portion of the stream of tuples to the first stream operator and the second portion of the stream of tuples to the FPGA card.

12. The system of claim 10, wherein in order to add the FPGA card to the operator graph, the processor is configured to:

configure the FPGA card to perform the first operation; and replace the first stream operator with the FPGA card.

13. The system of claim 10, wherein in order to determine that the first stream operator is the target operator, the processor is configured to:

determine a back pressure of each of the one or more stream operators; and determine that the back pressure first stream operator exceeds a first threshold.

14. The system of claim 10, wherein in order to determine that the first stream operator is the target operator, the processor is configured to:

determine a CPU utilization of each of the one or more stream operators; and determine that the CPU utilization of the first stream operator exceeds a threshold.

15. A computer program product for processing a stream of tuples, the computer program product comprising a computer readable storage medium having program code embodied therewith, the program code comprising computer readable program code configured to:

receive a stream of tuples to be processed by a plurality of processing elements operating on one or more computer processors;

identify, by monitoring one or more stream operators in an operator graph, a first stream operator that is configured to perform a first operation on the received stream of tuples;

determine that the first stream operator is a target operator;

determine that a field-programmable-gate-array (FPGA) card is configurable to perform the first operation;

determine that the FPGA card is available to perform the first operation;

add the FPGA card to the operator graph;

identify a second stream operator in the operator graph that is configured to perform a second operation on a second stream of tuples;

determine that the FPGA card is available to perform the second operation;

configuring the FPGA card to perform the second operation remove the FPGA card from the operator graph;

add, in response to the removing the FPGA card from the operator graph, the first stream operator into the operator graph;

remove, in response to the adding the first stream operator into the operator graph, the second stream form the operator graph; and re-add, in response to the removing the second stream operator from the operator graph, the FPGA card into the operator graph.

* * * * *